US012757169B2

(12) United States Patent
Wang et al.

(10) Patent No.: US 12,757,169 B2
(45) Date of Patent: Oct. 6, 2026

(54) RESOURCE RESELECTION METHOD AND APPARATUS, DEVICE, AND COMPUTER STORAGE MEDIUM

(71) Applicant: VIVO MOBILE COMMUNICATION CO., LTD., Guangdong (CN)

(72) Inventors: Huan Wang, Guangdong (CN); Zichao Ji, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 274 days.

(21) Appl. No.: 18/619,566

(22) Filed: Mar. 28, 2024

(65) Prior Publication Data

US 2024/0244590 A1 Jul. 18, 2024

Related U.S. Application Data

(63) Continuation of application No. PCT/CN2022/121268, filed on Sep. 26, 2022.

(30) Foreign Application Priority Data

Sep. 29, 2021 (CN) .......................... 202111152841.0

(51) Int. Cl.
*H04W 72/02* (2009.01)
*H04W 28/26* (2009.01)
(Continued)

(52) U.S. Cl.
CPC ........... *H04W 72/02* (2013.01); *H04W 28/26* (2013.01); *H04W 72/0446* (2013.01);
(Continued)

(58) Field of Classification Search
CPC ..... H04W 72/02; H04W 72/51; H04W 72/52; H04W 72/0446; H04W 72/0453; H04W 27/26
See application file for complete search history.

(56) References Cited

U.S. PATENT DOCUMENTS

2018/0249470 A1 8/2018 Seo
2022/0030556 A1 1/2022 Zheng et al.
(Continued)

FOREIGN PATENT DOCUMENTS

CN 106937380 A 7/2017
CN 108029115 A 5/2018
(Continued)

*Primary Examiner* — Erika A Washington
(74) *Attorney, Agent, or Firm* — Price Heneveld LLP

(57) ABSTRACT

This application discloses a resource reselection method and apparatus, a device, and a computer storage medium. The method includes: sending, by a first terminal, resource conflict indication information based on first information, where the first information includes any one of the following: the first terminal detecting that a transmission resource of a second terminal is in conflict, and the second terminal being a transmit end of the first terminal; the first terminal detecting that a first transmission resource is in conflict, and the first transmission resource being a specified transmission resource of the second terminal; a congestion situation of a resource pool of the first terminal; or a first order, where the first order represents an order in which the first terminal sends the resource conflict indication information.

19 Claims, 3 Drawing Sheets

A first terminal sends resource conflict indication information based on first information, where the first information includes any one of the following: the first terminal detecting that a transmission resource of a second terminal is in conflict, and the second terminal being a transmit end of the first terminal; the first terminal detecting that a first transmission resource is in conflict, and the first transmission resource being a specified transmission resource of the second terminal; a congestion situation of a resource pool of the first terminal; or a first order, where the first order represents an order in which the first terminal sends the resource conflict indication information 201

(51) Int. Cl.
*H04W 72/0446* (2023.01)
*H04W 72/0453* (2023.01)
*H04W 72/51* (2023.01)
*H04W 72/52* (2023.01)

(52) U.S. Cl.
CPC ....... *H04W 72/0453* (2013.01); *H04W 72/51* (2023.01); *H04W 72/52* (2023.01)

(56) References Cited

U.S. PATENT DOCUMENTS

| | | | | |
|---|---|---|---|---|
| 2022/0303954 | A1* | 9/2022 | Hwang | ............. H04W 72/0453 |
| 2023/0362739 | A1 | 11/2023 | Zhao | |

FOREIGN PATENT DOCUMENTS

| | | | | | |
|---|---|---|---|---|---|
| CN | 109219146 | A | | 1/2019 | |
| CN | 111615190 | A | | 9/2020 | |
| CN | 112840586 | A | | 5/2021 | |
| CN | 115474230 | A | * | 12/2022 | ............ H04W 28/02 |
| WO | WO-2017133446 | A1 | * | 8/2017 | ............ H04W 52/02 |
| WO | 2021091267 | A1 | | 5/2021 | |

* cited by examiner

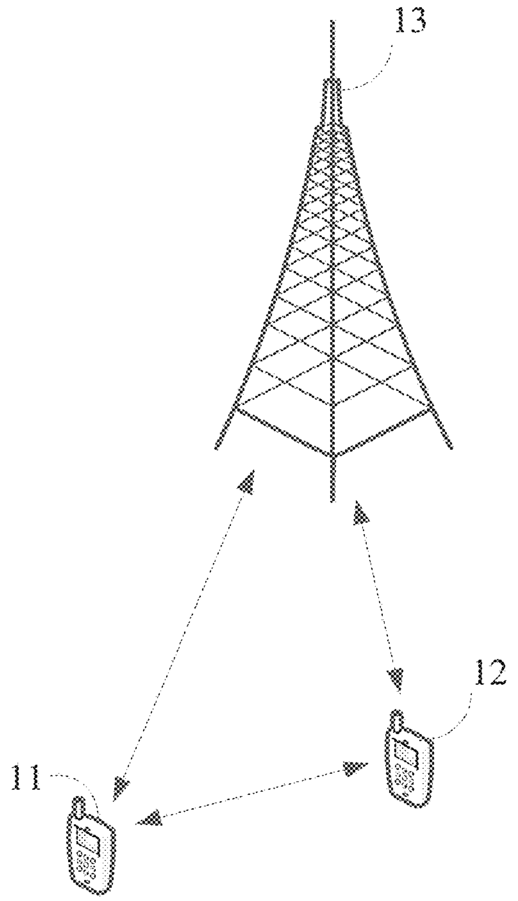

FIG. 1

A first terminal sends resource conflict indication information based on first information, where the first information includes any one of the following: the first terminal detecting that a transmission resource of a second terminal is in conflict, and the second terminal being a transmit end of the first terminal; the first terminal detecting that a first transmission resource is in conflict, and the first transmission resource being a specified transmission resource of the second terminal; a congestion situation of a resource pool of the first terminal; or a first order, where the first order represents an order in which the first terminal sends the resource conflict indication information

201

FIG. 2

RESOURCE RESELECTION METHOD AND APPARATUS, DEVICE, AND COMPUTER STORAGE MEDIUM

CROSS-REFERENCE TO RELATED APPLICATIONS

This application is a Bypass Continuation Application of PCT International Application No. PCT/CN2022/121268 filed on Sep. 26, 2022, which claims priority to Chinese Patent Application No. 202111152841.0, filed on Sep. 29, 2021 in China, which are incorporated herein by reference in their entireties.

TECHNICAL FIELD

This application relates to the field of communications technologies, and specifically, to a resource reselection method and apparatus, a device, and a computer storage medium.

BACKGROUND

In a sidelink (SL) resource selection enhancement solution, a terminal (UE) A (UE-A) performs resource conflict detection. If a resource conflict is detected, the UE-A sends a resource conflict indication to a UE B (UE-B), and the UE-B performs resource reselection based on the resource conflict indication. Based on the enhancement solution, a hidden node/exposed node problem existing in communication between a transmit end UE and the UE-A can be effectively resolved. Although transmission performance between the UE-A and the UE-B is improved in such a manner to an extent, excessive resource reselection causes deterioration of transmission reliability and/or a decrease in efficiency of a system.

SUMMARY

Embodiments of this application provide a resource reselection method and apparatus, a device, and a computer storage medium.

According to a first aspect, a resource reselection method is provided, where the method includes:

sending, by a first terminal, resource conflict indication information based on first information, where the first information includes any one of the following:

the first terminal detecting that a transmission resource of a second terminal is in conflict, and the second terminal being a transmit end of the first terminal;

the first terminal detecting that a first transmission resource is in conflict, and the first transmission resource being a specified transmission resource of the second terminal;

a congestion situation of a resource pool of the first terminal; or a first order, where the first order represents an order in which the first terminal sends the resource conflict indication information.

According to a second aspect, a resource reselection method is provided, where the method includes:

receiving, by a second terminal, resource conflict indication information from a first terminal, where the resource conflict indication information is sent by the first terminal based on first information; and performing, by the second terminal, resource reselection based on the resource conflict indication information, where the first information includes any one of the following:

the first terminal detecting that a transmission resource of the second terminal is in conflict;

the first terminal detecting that a first transmission resource is in conflict, and the first transmission resource being a specified transmission resource of the second terminal;

a congestion situation of a resource pool of the first terminal; or a first order, where the first order represents an order in which the first terminal sends the resource conflict indication information.

According to a third aspect, a resource reselection apparatus is provided, including:

a first sending module, configured to send resource conflict indication information based on first information, where the first information includes any one of the following:

the first terminal detecting that a transmission resource of a second terminal is in conflict, and the second terminal being a transmit end of the first terminal;

the first terminal detecting that a first transmission resource is in conflict, the first transmission resource being a specified transmission resource of a third terminal, and the third terminal being a transmit end of the first terminal;

p a congestion situation of a resource pool of the first terminal; or a first order, where the first order represents an order in which the first terminal sends the resource conflict indication information.

According to a fourth aspect, a resource reselection apparatus is provided, including:

a third receiving module, configured to receive resource conflict indication information from a first terminal, where the resource conflict indication information is sent by the first terminal based on first information; and a reselection module, configured to perform resource reselection based on the resource conflict indication information, where the first information includes any one of the following:

the first terminal detecting that a transmission resource of a second terminal is in conflict;

the first terminal detecting that a first transmission resource is in conflict, and the first transmission resource being a specified transmission resource of the second terminal;

a congestion situation of a resource pool of the first terminal; or a first order, where the first order represents an order in which the first terminal sends the resource conflict indication information.

According to a fifth aspect, a terminal is provided, including a processor, a memory, and a program that is stored in the memory and that is capable of running on the processor, where when the program is executed by the processor, the steps of the method according to the first aspect or the second aspect are implemented.

According to a sixth aspect, a readable storage medium is provided, where the readable storage medium stores a program or instructions, and when the program or the instructions are executed by a processor, the steps of the method according to the first aspect or the second aspect are implemented.

According to a seventh aspect, a computer program product is provided, where the computer program product is stored in a non-transient storage medium, and the computer program product is executed by at least one processor to implement the steps of the method according to the first aspect or the second aspect.

According to an eighth aspect, a chip is provided, where the chip includes a processor and a communication interface, the communication interface is coupled to the processor, and the processor is configured to run a program or instructions to implement the method according to the first aspect or the second aspect.

According to a ninth aspect, a communication device is provided, configured to perform the method according to the first aspect or the second aspect.

BRIEF DESCRIPTION OF DRAWINGS

FIG. 1 is a schematic diagram of a wireless communication system to which an embodiment of this application is applicable;

FIG. 2 is a flowchart 1 of a resource reselection method according to an embodiment of this application;

DESCRIPTION OF EMBODIMENTS

Figure 3:
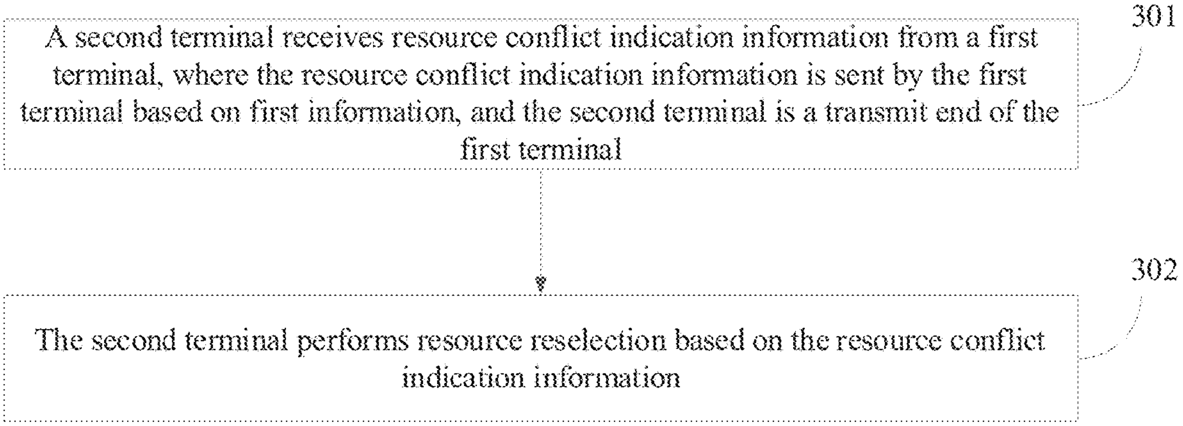
FIG. 3 is a flowchart 2 of a resource reselection method according to an embodiment of this application.

The following clearly describes technical solutions in the embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

Terms "first", "second", and the like in the specification and claims of this application are used to distinguish between similar objects, instead of describing a specific sequence or order. It should be understood that, the terms used in such a way is interchangeable in proper circumstances, so that the embodiments of this application can be implemented in an order other than the order illustrated or described herein. Objects classified by "first" and "second" are usually of a same type, and a quantity of objects is not limited. For example, there may be one or more first objects. In addition, "and" in the specification and claims represents at least one of connected objects. A symbol "/" generally represents an "or" relationship between associated objects.

It should be noted that, technologies described in the embodiments of this application are not limited to a new radio (NR) system, a long term evolution (LTE)/LTE-advanced (LTE-A) system, and may be further used in other wireless communication systems, such as code division multiple access (CDMA), time division multiple access (TDMA), frequency division multiple access (FDMA), orthogonal frequency division multiple access (OFDMA), single-carrier frequency division multiple access (SC-FDMA), and another system. Terms "system" and "network" in the embodiments of this application may be often used interchangeably. The technologies described can be applied to both the systems and the radio technologies mentioned above as well as to other systems and radio technologies. The following descriptions describe the NR system for example purposes, and NR terms are used in most of the following descriptions. However, the technologies can be further applied to an application other than an NR system application, for example, a $6^{th}$ generation (6G) communication system.

To better understand the embodiments of this application, the following technical points are first described:

1. Descriptions About New Radio (NR) Sidelink Resource Allocation/Selection

There are two NR SL resource allocation modes, one mode is based on base station scheduling (mode 1), and the other mode is based on autonomous resource selection of UE (mode 2). With regard to the resource allocation mode based on base station scheduling, a sidelink resource used by the UE for data transmission is determined by a base station, and transmit (TX) UE is notified by using downlink signaling. With regard to the resource allocation mode based on autonomous selection of the UE, the UE selects an available transmission resource from a (pre-)configured resource pool, and the UE performs channel sensing before resource selection, selects a resource set with less interference based on a channel sensing result, and then randomly selects a resource for transmission from the resource set.

For the mode 2, a specific working manner is as follows:

(1) After triggering resource selection, the TX UE first determines a resource selection window, where a lower boundary of the resource selection window is at a time T1 after the resource selection is triggered, and an upper boundary of the resource selection is at a time T2 after the triggering. T2 is a value selected within a packet delay budget (PDB) of a transport block (TB) in a mode implemented by the UE, and T2 is not earlier than T1.

(2) Before the resource selection, the UE needs to determine a candidate resource set for the resource selection, and compares a reference signal received power (RSRP) measured on a resource in the resource selection window with a corresponding RSRP threshold. If the RSRP is greater than the RSRP threshold, the resource is excluded and cannot be included in the candidate resource set. After resource exclusion, a remaining resource in the resource selection window forms the candidate resource set. The resource in the candidate resource set accounts for at least x % of resources in the resource selection window. If the resource in the candidate resource set accounts for less than x % of the resources in the resource selection window, the RSRP threshold needs to be increased according to a step-by-step value (3 dB), and then the resource exclusion is performed until no less than x % resources can be selected.

(3) After the candidate resource set is determined, the UE randomly selects a transmission resource in the candidate resource set. In addition, during current transmission, the UE may reserve a transmission resource for next transmission.

The UE in the mode 2 determines the candidate resource set by sensing transmission resource reservation of proximity UE. Therefore, the resource exclusion in the mode 2 may be referred to as "resource exclusion based on a reserved transmission resource", and the resource selection in the mode 2 may be referred to as resource selection for "the resource exclusion based on the reserved transmission resource".

2. Descriptions About NR Sidelink Resource Allocation/Selection Enhancement

UE-A performs resource conflict detection. If a resource conflict is detected, the UE-A sends a resource conflict indication to UE-B, and the UE-B performs resource reselection based on the resource conflict indication. A scenario in which the UE-A determines the resource conflict includes but is not limited to the following:

A physical sidelink control channel (PSCCH)/physical sidelink shared channel (PSSCH) transmission resource from UE-x to the UE-A conflicts with a PSCCH/PSSCH transmission resource from UE-y (the UE-y to the UE-A, or the UE-y to UE-z), and the UE-A triggers the UE-x or the UE-y to perform resource reselection. UE performing resource reselection is the UE-B.

The PSCCH/PSSCH transmission resource from the UE-x to the UE-A conflicts with the PSCCH/PSSCH transmission resource from the UE-y (the UE-y to the UE-A, or the UE-y to the UE-z), and the UE-A triggers the UE-x or the UE-y to perform resource reselection.

Transmission performance from the UE-x/UE-y to the UE-A is improved to an extent. However, excessive resource reselection causes deterioration of transmission reliability and/or a decrease in efficiency of a system. Therefore, the solution should avoid excessive resource reselection/redundant resource reselection as much as possible. In addition, improper resource reselection also cannot improve transmission performance from the UE-x/UE-y to the UE-A.

Therefore, it is urgent to resolve how the UE-A triggers resource reselection under what circumstances, and how resource reselection behavior of the UE-B should be enhanced.

FIG. 1 is a block diagram of a wireless communication system to which an embodiment of this application is applicable. The wireless communication system includes a terminal 11, a terminal 12 and a network side device 13. The terminal may alternatively be referred to as a terminal device or UE. The terminal may be a terminal side device, such as a mobile phone, a tablet personal computer, a laptop computer or a notebook computer, a personal digital assistant (PDA), a palmtop computer, a netbook computer, an ultra-mobile personal computer (UMPC), a mobile Internet device (MID), an augmented reality (AR)/virtual reality (VR) device, a robot, a wearable device, vehicle user equipment (VUE), pedestrian user equipment (PUE), or a smart home (home equipment with a wireless communication function, such as a refrigerator, a television, a washing machine, or furniture). The wearable device includes a smartwatch, a smart band, a smart headset, smart glasses, smart jewelry (a smart bracelet, a smart chain bracelet, a smart ring, a smart necklace, a smart anklet, a smart chain anklet, or the like), a smart wristband, smart clothing, a game console, or the like. It should be noted that a specific type of the terminal 11 and a specific type of the terminal 12 are not limited in the embodiments of this application.

The network side device 13 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (gNB), a home NodeB, a home evolved NodeB, a WLAN access point, a Wi-Fi node, a transmission reception point (TRP), a radio access network node, or another appropriate term in the art. As long as a same technical effect is achieved, the base station is not limited to a specified technical term. It should be noted that, in the embodiments of this application, only a base station in an NR system is used as an example. However, a specific type of the base station is not limited.

As shown in FIG. 2, an embodiment of this application provides a resource reselection method. Specific steps include step 201.

Step 201: A first terminal sends resource conflict indication information based on first information.

The first information includes any one of the following:

(1) The first terminal detects that a transmission resource of a second terminal is in conflict, and the second terminal is a transmit end of the first terminal.

For example, the first terminal may alternatively be described as UE-A, and the second terminal may alternatively be described as UE-B.

In this case, before triggering resource reselection, the first terminal detects that a transmission resource from a specific transmit end is in conflict, to avoid excessive resource reselection/redundant resource reselection.

The transmission resource in this specification may be a physical sidelink control channel (PSCCH) or physical sidelink shared channel (PSSCH) transmission resource.

(2) The first terminal detects that a first transmission resource is in conflict, and the first transmission resource is a specified transmission resource of the second terminal.

In this case, before triggering resource reselection, the first terminal detects that a specific transmission resource from a transmit end of the first terminal is in conflict, to avoid excessive resource reselection/redundant resource reselection.

(3) A congestion situation of a resource pool of the first terminal.

In this case, the first terminal may enable the feature based on the congestion situation of the resource pool, to avoid deterioration of system performance caused by excessive resource reselection.

(4) A first order, where the first order represents an order in which the first terminal sends the resource conflict indication information.

In this case, if a transmission resource from a transmit end of the first terminal to the first terminal conflicts with a plurality of (or one) other transmission resources, transmission resources in conflict may be successively triggered based on the first order, to avoid system performance deterioration caused by blindly triggering all/excessive conflicting resource reselection.

In an implementation of this application, the method further includes one or more of the following:

Manner a: The first terminal receives second information from the second terminal.

For example, the first terminal receives the second information from the second terminal by using PC5 radio resource control (RRC) signaling.

The second information indicates whether the second terminal is capable of receiving the resource conflict indication information sent by the first terminal, and/or the second information indicates whether the second terminal is capable of performing resource reselection based on the resource conflict indication information sent by the first terminal.

Manner b: The first terminal sends third information to the second terminal.

For example, the first terminal sends the third information to the second terminal by using PC5-RRC signaling.

The third information indicates whether the first terminal is capable of detecting that the transmission resource of the second terminal is in conflict, and/or the third information indicates that the first terminal sends the resource conflict indication information when detecting that the transmission resource of the second terminal is in conflict.

It can be understood that the first terminal and the second terminal negotiate whether the first terminal can send the resource conflict indication information when detecting that the transmission resource of the second terminal is in conflict. For example, the first terminal and the second terminal negotiate, for specific resources by using the PC5-RRC signaling, whether the first terminal can send the resource conflict indication information when detecting that the transmission resource of the second terminal is in conflict, where the PC5-RRC signaling carries a resource identifier (source Identity document, source ID) or a destination identifier (destination ID).

In an implementation of this application, the method further includes:

receiving, by the first terminal, fourth information from the second terminal, where the fourth information indicates whether the first terminal needs to send the resource conflict indication information when detecting that the first transmission resource is in conflict, and a transmission resource of the fourth information is associated with the first transmission resource.

In an implementation of this application, the congestion situation of the resource pool of the first terminal includes any one of the following:

(1) A congestion degree of the resource pool of the first terminal is higher than a first preset threshold.

Optionally, the congestion degree may be a channel busy ratio (CBR). Certainly, the congestion degree is not limited thereto.

(2) A congestion degree of the resource pool of the first terminal is higher than a first preset threshold, and the first terminal detects that the transmission resource of the second terminal is in conflict.

(3) A congestion degree of the resource pool of the first terminal is higher than a first preset threshold, and the first terminal detects that the first transmission resource is in conflict.

A transmission priority of the first transmission resource is higher than a second preset threshold; a transmission priority of the first transmission resource is lower than a third preset threshold; or transmission of the first transmission resource is of a preset cast type, such as unicast or multicast (groupcast).

Optionally, the first preset threshold is specified in a protocol, or configured or pre-configured by a control node.

In an implementation of this application, before the step of sending, by the first terminal, the resource conflict indication information based on the first order, the method further includes:

detecting, by the first terminal, a second transmission resource of at least one transmit end of the first terminal, where the second transmission resource is a transmission resource at a first moment.

Optionally, the second transmission resource is a transmission resource reserved by the transmit end of the first terminal, and the reservation includes at least one of periodic resource reservation or aperiodic resource reservation.

In an implementation of this application, when the first terminal detects a plurality of second transmission resources of transmit ends of the first terminal, the method further includes:

performing, by the first terminal based on a second order, conflict determining on the second transmission resources of the plurality of transmit ends of the first terminal, where the second order is determined based on one or more of the following:

(1) a priority of the second transmission resource, where for example, conflict determining is first performed on a second transmission resource with a low priority;

(2) a quantity of transmission resources that conflict with the second transmission resource, where for example, for a second transmission resource, if there is a largest quantity of transmission resources that conflict with the second transmission resource, conflict determining is first performed on the second transmission resource;

(3) a sequence number of a frequency domain resource of the second transmission resource, where for example, for a second transmission resource, if a frequency domain starting location of the second transmission resource has a largest/smallest sequence number, conflict determining is first performed on the second transmission resource;

(4) a measurement value of the second transmission resource, where for example, for a second transmission resource, if a measured RSRP or received signal strength indication (RSSI) of the second transmission resource has a largest/smallest value, conflict determining is first performed on the second transmission resource;

(5) a sending time of first signaling (or described as resource reservation signaling), where the first signaling is used by the transmit end of the first terminal to indicate that the second transmission resource is a reserved resource; and for example, for a second transmission resource, if first signaling for measurement of the second transmission resource is sent earlier, conflict determining is preferentially performed on the second transmission resource;

(6) a time at which the transmit end of the first terminal selects the second transmission resource;

(7) being autonomously selected by the first terminal;

(8) being specified in a protocol;

(9) being configured by a control node; and

(10) being pre-configured.

It should be noted that a plurality of second transmission resources may come from a same transmit end; or some may come from a same transmit end, and some may come from another transmit end; or the second transmission resources come from different transmit ends.

In an implementation of this application, the transmission resource in conflict includes one or more of the following:

(1) a transmission resource of the transmit end of the first terminal; and (2) a transmission resource of a third terminal, where the third terminal is not the transmit end of the first terminal.

The third terminal may alternatively be described as a transmit end that is not the first terminal.

In an implementation of this application, the performing conflict determining on the second transmission resources of the plurality of transmit ends of the first terminal includes:

respectively performing conflict determining on first to $N^{th}$ second transmission resources of the transmit ends of the first terminal, where $N^{th}$ is greater than 1.

For example, the first terminal performs conflict determining on the first second transmission resource of the transmit end of the first terminal and uses corresponding reselection triggering behavior. Then, the first terminal performs conflict determining on a second second transmission resource of the transmit end of the first terminal, and uses corresponding reselection triggering behavior. Then, the first terminal performs conflict determining on a third second transmission resource of the transmit end of the first terminal, and uses corresponding reselection triggering behavior. Then, the first terminal performs conflict determining on a fourth second transmission resource of the transmit end of the first terminal, and uses corresponding reselection triggering behavior, until all conflicts are resolved.

It should be noted that if a first terminal performs a conflict indication on a second transmission resource/is triggered to perform resource reselection, there is no need to perform conflict determining on the second transmission resource.

In an implementation of this application, the respectively performing conflict determining on first to $N^{th}$ second transmission resources of the transmit ends of the first terminal includes:

detecting whether a second transmission resource of a first transmit end of the first terminal belongs to a non-preferred resource identified by the first terminal; and if the second transmission resource belongs to the non-preferred resource identified by the first terminal, determining that the second transmission resource of the first transmit end is in resource conflict, where the non-preferred resource may be a resource different from the preferred resource; or detecting whether a second transmission resource of a first transmit end of the first terminal overlaps a transmission resource of any terminal; and if there are overlapping transmission resources, determining that the second transmission resource of the first transmit end is in resource conflict, where a transmission type of transmission resources of some or all transmit ends that are of the first terminal and that correspond to the overlapping transmission resources is a preset cast type; or a transmission priority of transmission resources of some or all transmit ends that are of the first terminal and that correspond to the overlapping transmission resources is higher than or equal to a preset priority.

Optionally, the foregoing any terminal may not include the first terminal.

In an implementation of this application, the sending resource conflict indication information includes:

when it is determined that the second transmission resource of the first transmit end is in resource conflict, sending the resource conflict indication information in a first triggering manner to trigger resource reselection, where the first triggering manner includes one or more of the following:

manner 1 (option 1): triggering the first transmit end to perform resource reselection; and manner 2 (option 2): triggering a target transmit end to perform resource reselection, where the target transmit end includes at least one of the following: (a) the first transmit end; (b) a fourth terminal, where the fourth terminal is any terminal that has a resource overlapping the transmission resource of the first transmit end; (c) a fifth terminal, where a transmission resource of the fifth terminal at least partially overlaps the transmission resource of the first transmit end, and the fifth terminal is a transmit end of the first terminal.

Optionally, a measurement value of a transmission resource of the fourth terminal or the transmission resource of the fifth terminal is greater than a fourth preset threshold.

Optionally, the fourth preset threshold is equal to a first threshold, and the first threshold is a threshold used when the first terminal identifies the non-preferred resource based on strength of a transmission signal on the transmission resource.

Optionally, the first triggering manner includes: whether to trigger the first transmit end or the target transmit end to perform resource reselection is specified in a protocol, that is, an execution condition of triggering the first transmit end to perform resource reselection and an execution condition of triggering the target transmit end to perform resource reselection may be specified.

If the foregoing manner 1 is used, the first transmit end is triggered to perform resource reselection. However, if the resource pool enables a preemption check, a terminal having a resource overlapping the transmission resource of the first transmit end may be triggered based on the preemption check to perform reselection, resulting in redundant resource reselection.

If in the foregoing manner 2, there may be a plurality of terminals having a resource overlapping the transmission resource of the first transmit end, resource reselection by a plurality of UEs is directly caused in the manner 2. This is not conducive to maintaining system performance.

In an implementation of this application, the execution condition of the manner 1 or the manner 2 may be specified in a protocol, thereby reducing negative impact on system performance. The execution condition includes at least one of the following:

Execution condition 1: If the resource pool does not enable the preemption check, the manner 1 is used.

Execution condition 2: If the corresponding resource pool enables the preemption check, the manner 1 is used in at least the following cases:

case a: If a corresponding transmission priority of a terminal having a resource overlapping that of the first transmit end or an $x^{th}$ transmit end is lower than or not higher than a preset threshold, the manner 1 is used; and/or case b: A corresponding transmission priority of the first transmit end or an $x^{th}$ transmit end is higher than or equal to a corresponding transmission priority of a terminal having a resource overlapping that of the first transmit end or an $x^{th}$ transmit end.

(3) A quantity of transmission resources that are of another terminal and that overlap a transmission resource of the first transmit end or an $x^{th}$ transmit end is greater than the preset threshold.

In an implementation of this application, the triggering a target transmit end to perform resource reselection includes:

when there are a plurality of target transmit ends, triggering each target transmit end based on a third order to perform resource reselection, where for example, the third order is an order in which transmission priorities are from large to small or transmission priorities are from small to large.

In an implementation of this application, the method further includes:

after triggering one target transmit end to perform resource reselection, determining, by the first terminal again, whether the second transmission resource of the first transmit end is still in resource conflict.

In an implementation of this application, in a process in which the first terminal determines whether the second transmission resource of the first transmit end is still in resource conflict, a transmission resource on which the first terminal determines to perform a resource conflict indication is not included in a resource conflict determining process, that is, the first terminal ignores transmission resources on which triggering reselection is determined.

In an implementation of this application, the respectively performing conflict determining on first to $N^{th}$ second transmission resources of the transmit ends of the first terminal further includes:

when the first terminal performs conflict determining on the second transmission resource of the transmit end of the first terminal, skipping including, in a resource conflict determining process, a transmission resource on which the first terminal determines to perform a resource conflict indication, that is, ignoring a transmission resource on which triggering reselection is determined.

Optionally, the resource conflict indication information is used to indicate the second terminal to exclude, when identifying a candidate resource set, a time domain and/or frequency domain transmission resource occupied by a transmission resource on which the first terminal determines to trigger reselection; the resource conflict indication information is used to indicate the second terminal to exclude, from a candidate resource set when performing resource selection, a time domain and/or frequency domain transmission resource occupied by a transmission resource on which the first terminal determines to trigger reselection; the resource conflict indication information is used to indicate the second terminal to exclude, when identifying a candidate resource set, a time domain and/or frequency domain transmission resource associated with a feedback resource corresponding to a transmission resource on which the first terminal determines to trigger reselection; or the resource conflict indication information is used to indicate the second terminal to exclude, from a candidate resource set, a time domain and/or frequency domain transmission resource associated with a feedback resource corresponding to a transmission resource on which the first terminal determines to trigger reselection.

The feedback resource in this specification may be a physical sidelink feedback channel (PSFCH) feedback resource, and a transmission resource associated with the feedback resource may be a PSCCH or PSSCH transmission resource mapped on a corresponding PFSCH occasion.

In this way, useless resource reselection caused by the second terminal repeatedly selecting a same resource and a failure to avoid a resource conflict are avoided.

In this embodiment of this application, the first terminal may trigger resource reselection based on the first information, to avoid a problem of deterioration of transmission reliability and/or a decrease in efficiency of a system caused by excessive resource reselection.

As shown in FIG. 3, an embodiment of this application provides a resource reselection method. Specific steps include step 301 and step 302.

Step 301: A second terminal receives resource conflict indication information from a first terminal, where the resource conflict indication information is sent by the first terminal based on first information, for example, the second terminal is a transmit end of the first terminal.

Step 302: The second terminal performs resource reselection based on the resource conflict indication information.

The first information includes any one of the following:

(1) the first terminal detecting that a transmission resource of the second terminal is in conflict;

(2) the first terminal detecting that a first transmission resource is in conflict, and the first transmission resource being a specified transmission resource of the second terminal;

(3) a congestion situation of a resource pool of the first terminal; or (4) a first order, where the first order represents an order in which the first terminal sends the resource conflict indication information.

In an implementation of this application, the method further includes:

sending, by the first terminal, second information to the second terminal, where the second information indicates whether the second terminal is capable of receiving the resource conflict indication information sent by the first terminal, and/or the second information indicates whether the second terminal is capable of performing resource reselection based on the resource conflict indication information sent by the first terminal; and/or receiving, by the second terminal, third information from the first terminal, where the third information indicates whether the first terminal is capable of detecting that the transmission resource of the second terminal is in conflict, and/or the third information indicates that the first terminal sends the resource conflict indication information when detecting that the transmission resource of the second terminal is in conflict.

In an implementation of this application, the method further includes: sending, by the second terminal, fourth information to the first terminal, where the fourth information indicates whether the first terminal needs to send the resource conflict indication information when detecting that the first transmission resource is in conflict, and a transmission resource of the fourth information is associated with the first transmission resource.

In an implementation of this application, the congestion situation of the resource pool of the first terminal includes any one of the following:

a congestion degree of the resource pool of the first terminal is higher than a first preset threshold;

a congestion degree of the resource pool of the first terminal is higher than a first preset threshold, and the first terminal detects that the transmission resource of the second terminal is in conflict; or a congestion degree of the resource pool of the first terminal is higher than a first preset threshold, and the first terminal detects that the first transmission resource is in conflict, where a transmission priority of the first transmission resource is higher than a second preset threshold; a transmission priority of the first transmission resource is lower than a third preset threshold; or transmission of the first transmission resource is of a preset cast type.

In an implementation of this application, the performing, by the second terminal, resource reselection based on the resource conflict indication information includes:

when identifying a candidate resource set, excluding, by the second terminal based on the resource conflict indication information, a time domain and/or frequency domain transmission resource occupied by a transmission resource on which the first terminal determines to trigger reselection; or excluding, by the second terminal from a candidate resource set based on the resource conflict indication information, a time domain and/or frequency domain transmission resource occupied by a transmission resource on which the first terminal determines to trigger reselection; or when identifying a candidate resource set, excluding, by the second terminal based on the resource conflict indication information, a time domain and/or frequency domain transmission resource associated with a feedback resource corresponding to a transmission resource on which the first terminal determines to trigger reselection; or excluding, by the second terminal from a candidate resource set based on the resource conflict indication information, a time domain and/or frequency domain transmission resource associated with a feedback resource corresponding to a transmission resource on which the first terminal determines to trigger reselection.

In this embodiment of this application, the second terminal may receive the resource conflict indication information from the first terminal. The resource conflict indication information is sent by the first terminal based on the first information, thereby avoiding a problem of deterioration of transmission reliability and/or a decrease in efficiency of a system caused by excessive resource reselection by the second terminal.

Figure 4:
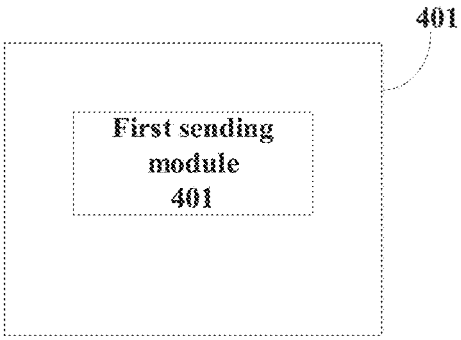
FIG. 4 is a schematic diagram 1 of a resource reselection apparatus according to an embodiment of this application.

As shown in FIG. 4, an embodiment of this application provides a resource reselection apparatus, applied to a first terminal. The apparatus includes:

a first sending module 401, configured to send resource conflict indication information based on first information, where the first information includes any one of the following:

(1) the first terminal detecting that a transmission resource of a second terminal is in conflict, and the second terminal being a transmit end of the first terminal, where for example, the first terminal may alternatively be described as UE-A, and the second terminal may alternatively be described as UE-B;

(2) the first terminal detecting that a first transmission resource is in conflict, the first transmission resource being a specified transmission resource of a third terminal, and the third terminal being a transmit end of the first terminal;

(3) a congestion situation of a resource pool of the first terminal; or (4) a first order, where the first order represents an order in which the first terminal sends the resource conflict indication information.

In an implementation of this application, the apparatus further includes:

a first receiving module, configured to receive second information from the second terminal, where the second information indicates whether the second terminal is capable of receiving the resource conflict indication information sent by the first terminal, and/or the second information indicates whether the second terminal is capable of performing resource reselection based on the resource conflict indication information sent by the first terminal; and/or a second sending module, configured to send third information to the second terminal, where the third information indicates whether the first terminal is capable of detecting that the transmission resource of the second terminal is in conflict, and/or the third information indicates that the first terminal sends the resource conflict indication information when detecting that the transmission resource of the second terminal is in conflict.

In an implementation of this application, the apparatus further includes:

a second receiving module, configured to receive fourth information from the third terminal, where the fourth information indicates whether the first terminal needs to send the resource conflict indication information when detecting that the first transmission resource is in conflict, and a transmission resource of the fourth information is associated with the first transmission resource.

In an implementation of this application, the congestion situation of the resource pool of the first terminal includes any one of the following:

(1) a congestion degree of the resource pool of the first terminal is higher than a first preset threshold;

(2) a congestion degree of the resource pool of the first terminal is higher than a first preset threshold, and the first terminal detects that the transmission resource of the second terminal is in conflict; or (3) a congestion degree of the resource pool of the first terminal is higher than a first preset threshold, and the first terminal detects that the first transmission resource is in conflict, where a transmission priority of the first transmission resource is higher than a second preset threshold; a transmission priority of the first transmission resource is lower than a third preset threshold; or transmission of the first transmission resource is of a preset cast type, such as unicast or groupcast.

Optionally, the first preset threshold is specified in a protocol, or configured or pre-configured by a control node.

In an implementation of this application, the apparatus further includes:

a detection module, configured to detect a second transmission resource of at least one transmit end of the first terminal, where the second transmission resource is a transmission resource at a first moment.

Optionally, the second transmission resource is a transmission resource reserved by the transmit end of the first terminal, and the reservation includes at least one of periodic resource reservation or aperiodic resource reservation.

In an implementation of this application, the apparatus further includes:

a first determining module, configured to perform, based on a second order, conflict determining on second transmission resources of a plurality of transmit ends of the first terminal, where the second order is determined based on one or more of the following:

(1) a priority of the second transmission resource;

(2) a quantity of transmission resources that conflict with the second transmission resource;

(3) a sequence number of a frequency domain resource of the second transmission resource;

(4) a measurement value of the second transmission resource;

(5) a sending time of first signaling, where the first signaling is used by the transmit end of the first terminal to indicate that the second transmission resource is a reserved resource;

(6) a time at which the transmit end of the first terminal selects the second transmission resource;

(7) being autonomously selected by the first terminal;

(8) being specified in a protocol;

(9) being configured by a control node; and

(10) being pre-configured.

In an implementation of this application, the transmission resource in conflict includes one or more of the following:

(1) a transmission resource of the transmit end of the first terminal; and (2) a transmission resource of a fourth terminal, where the fourth terminal is not the transmit end of the first terminal.

In an implementation of this application, the first determining module is further configured to respectively perform conflict determining on first to $N^{th}$ second transmission resources of the transmit ends of the first terminal, where $N^{th}$ is greater than 1.

In an implementation of this application, the first determining module is further configured to: detect whether a second transmission resource of a first transmit end of the first terminal belongs to a non-preferred resource identified by the first terminal; and if the second transmission resource belongs to the non-preferred resource identified by the first terminal, determine that the second transmission resource of the first transmit end is in resource conflict; or detect whether a second transmission resource of a first transmit end of the first terminal overlaps a transmission resource of any terminal; and if there are overlapping transmission resources, determine that the second transmission resource of the first transmit end is in resource conflict, where a transmission type of transmission resources of some or all transmit ends that are of the first terminal and that correspond to the overlapping transmission resources is a preset cast type; or a transmission priority of transmission resources of some or all transmit ends that are of the first terminal and that correspond to the overlapping transmission resources is higher than or equal to a preset priority.

Optionally, the foregoing any terminal may not include the first terminal.

In an implementation of this application, the sending resource conflict indication information includes:

when it is determined that the second transmission resource of the first transmit end is in resource conflict, sending the resource conflict indication information in a first triggering manner to trigger resource reselection, where the first triggering manner includes: triggering the first transmit end to perform resource reselection; or triggering a target transmit end to perform resource reselection, where the target transmit end includes at least one of the following: the first transmit end; a fifth terminal, where the fifth terminal is any terminal that has a resource overlapping the transmission resource of the first transmit end; a sixth terminal, where a transmission resource of the sixth terminal at least partially overlaps the transmission resource of the first transmit end, and the sixth terminal is a transmit end of the first terminal.

Optionally, a measurement value of a transmission resource of the fifth terminal or the transmission resource of the sixth terminal is greater than a fourth preset threshold.

Optionally, the fourth preset threshold is equal to a first threshold, and the first threshold is a threshold used when the first terminal identifies the non-preferred resource based on strength of a transmission signal on the transmission resource.

In an implementation of this application, the triggering a target transmit end to perform resource reselection includes:

when there are a plurality of target transmit ends, triggering each target transmit end based on a third order to perform resource reselection.

In an embodiment of this application, the apparatus further includes:

a second determining module, configured to: after triggering one target transmit end to perform resource reselection, determine whether the second transmission resource of the first transmit end is still in resource conflict.

In an implementation of this application, in a process in which the first terminal determines whether the second transmission resource of the first transmit end is still in resource conflict, a transmission resource on which the first terminal determines to perform a resource conflict indication is not included in a resource conflict determining process.

Optionally, the first triggering manner includes: whether to trigger the first transmit end or the target transmit end to perform resource reselection is specified in a protocol.

In an implementation of this application, the respectively performing conflict determining on first to $N^{th}$ second transmission resources of the transmit ends of the first terminal further includes:

when performing conflict determining on the second transmission resource of the transmit end of the first terminal, determining that a transmission resource on which the first terminal determines to perform a resource conflict indication is not included in a resource conflict determining process.

Optionally, the resource conflict indication information is used to indicate the second terminal to exclude, when identifying a candidate resource set, a time domain and/or frequency domain transmission resource occupied by a transmission resource on which the first terminal determines to trigger reselection; the resource conflict indication information is used to indicate the second terminal to exclude, from a candidate resource set when performing resource selection, a time domain and/or frequency domain transmission resource occupied by a transmission resource on which the first terminal determines to trigger reselection; the resource conflict indication information is used to indicate the second terminal to exclude, when identifying a candidate resource set, a time domain and/or frequency domain transmission resource associated with a feedback resource corresponding to a transmission resource on which the first terminal determines to trigger reselection; or the resource conflict indication information is used to indicate the second terminal to exclude, from a candidate resource set, a time domain and/or frequency domain transmission resource associated with a feedback resource corresponding to a transmission resource on which the first terminal determines to trigger reselection.

The apparatus provided in this embodiment of this application can implement the processes implemented in the method embodiment shown in FIG. 2 and a same technical effect is achieved. To avoid repetition, details are not described herein again.

Figure 5:
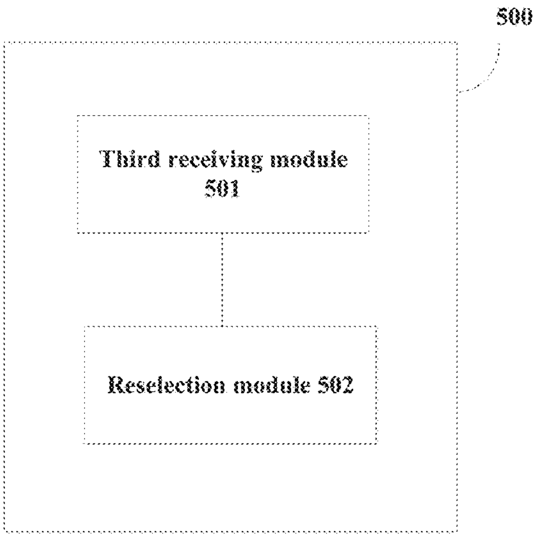
FIG. 5 is a schematic diagram 2 of a resource reselection apparatus according to an embodiment of this application.

As shown in FIG. 5, an embodiment of this application provides a resource reselection apparatus, applied to a second terminal. The apparatus 500 includes:

a third receiving module 501, configured to receive resource conflict indication information from a first terminal, where the resource conflict indication information is sent by the first terminal based on first information, for example, the second terminal is a transmit end of the first terminal;

a reselection module 502, configured to perform resource reselection based on the resource conflict indication information, where the first information includes any one of the following:

(1) the first terminal detecting that a transmission resource of the second terminal is in conflict;

(2) the first terminal detecting that a first transmission resource is in conflict, and the first transmission resource being a specified transmission resource of the second terminal;

(3) a congestion situation of a resource pool of the first terminal; or (4) a first order, where the first order represents an order in which the first terminal sends the resource conflict indication information.

In an implementation of this application, the apparatus further includes:

a fourth sending module, configured to send second information to the first terminal, where the second information indicates whether the second terminal is capable of receiving the resource conflict indication information sent by the first terminal, and/or the second information indicates whether the second terminal is capable of performing resource reselection based on the resource conflict indication information sent by the first terminal; and/or a fourth receiving module, configured to receive third information from the first terminal, where the third information indicates whether the first terminal is capable of detecting that the transmission resource of the second terminal is in conflict, and/or the third information indicates that the first terminal sends the resource conflict indication information when detecting that the transmission resource of the second terminal is in conflict.

In an implementation of this application, the apparatus further includes:

a fifth sending module, configured to send fourth information to the first terminal, where the fourth information indicates whether the first terminal needs to send the resource conflict indication information when detecting that the first transmission resource is in conflict, and a transmission resource of the fourth information is associated with the first transmission resource.

In an implementation of this application, the congestion situation of the resource pool of the first terminal includes any one of the following:

a congestion degree of the resource pool of the first terminal is higher than a first preset threshold;

a congestion degree of the resource pool of the first terminal is higher than a first preset threshold, and the first terminal detects that the transmission resource of the second terminal is in conflict; or a congestion degree of the resource pool of the first terminal is higher than a first preset threshold, and the first terminal detects that the first transmission resource is in conflict, where a transmission priority of the first transmission resource is higher than a second preset threshold; a transmission priority of the first transmission resource is lower than a third preset threshold; or transmission of the first transmission resource is of a preset cast type.

In an implementation of this application, the reselection module 502 is further configured to:

when identifying a candidate resource set, exclude, based on the resource conflict indication information, a time domain and/or frequency domain transmission resource occupied by a transmission resource on which the first terminal determines to trigger reselection; or exclude, from a candidate resource set based on the resource conflict indication information, a time domain and/or frequency domain transmission resource occupied by a transmission resource on which the first terminal determines to trigger reselection; or when identifying a candidate resource set, exclude, based on the resource conflict indication information, a time domain and/or frequency domain transmission resource associated with a feedback resource corresponding to a transmission resource on which the first terminal determines to trigger reselection; or exclude, from a candidate resource set based on the resource conflict indication information, a time domain and/or frequency domain transmission resource associated with a feedback resource corresponding to a transmission resource on which the first terminal determines to trigger reselection.

The apparatus provided in this embodiment of this application can implement the processes implemented in the method embodiment shown in FIG. 3 and a same technical effect is achieved. To avoid repetition, details are not described herein again.

An embodiment of this application further provides a terminal, including a processor and a communication interface. The processor is configured to execute a procedure of the method shown in FIG. 2 or FIG. 3. This terminal embodiment corresponds to the foregoing method embodiment on the terminal side. Each implementation process and implementation of the foregoing method embodiment may be applicable to this terminal embodiment, and a same technical effect can be achieved.

Figure 6:
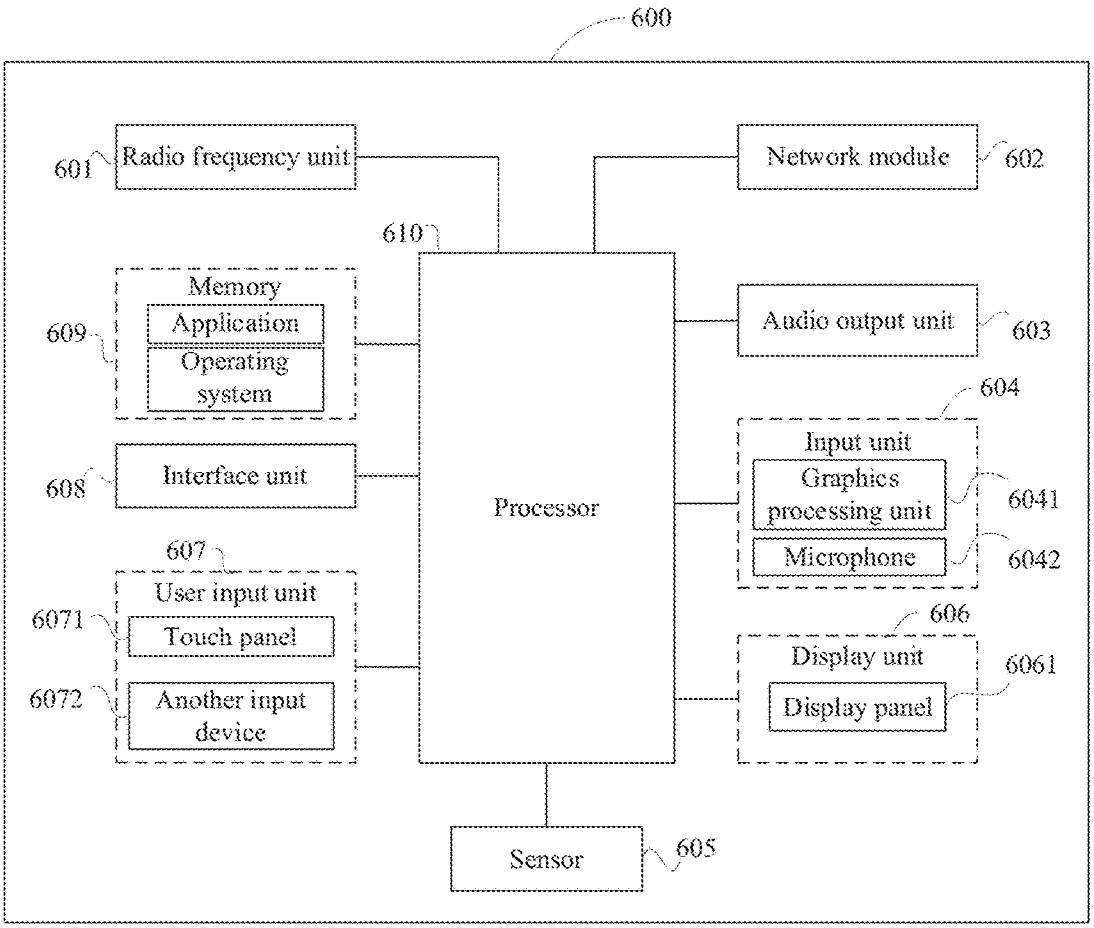
FIG. 6 is a schematic diagram of a terminal according to an embodiment of this application.

Specifically, FIG. 6 is a schematic diagram of a hardware structure of a terminal according to an embodiment of this application. The terminal 600 includes but is not limited to at least some components in the following: a radio frequency unit 601, a network module 602, an audio output unit 603, an input unit 604, a sensor 605, a display unit 606, a user input unit 607, an interface unit 608, a memory 609, a processor 610, and the like.

A person skilled in the art can understand that the terminal 600 may further include a power supply (for example, a battery) that supplies power to each component. The power supply may be logically connected to the processor 610 by using a power supply management system, to implement functions such as charging and discharging management and power consumption management by using the power supply management system. The terminal structure shown in FIG. 6 constitutes no limitation on the terminal, and the terminal may include more or fewer components than those shown in the figure, or combine some components, or have different component arrangements. Details are not described herein.

It should be understood that in this embodiment of this application, the input unit 604 may include a graphics processing unit (GPU) 6041 and a microphone 6042, and the graphics processing unit 6041 processes image data of a static picture or video obtained by an image capture apparatus (such as a camera) in a video capture mode or an image capture mode. The display unit 606 may include a display panel 6061. The display panel 6061 may be configured in a form such as a liquid crystal display or an organic light-emitting diode. The user input unit 607 includes a touch panel 6071 and another input device 6072. The touch panel 6071 is also referred to as a touchscreen. The touch panel 6071 may include two parts: a touch detection apparatus and a touch controller. The another input device 6072 may include but is not limited to a physical keyboard, a functional button (such as a volume control button or a power on/off button), a trackball, a mouse, and a joystick. Details are not described herein.

In this embodiment of this application, the radio frequency unit 601 receives downlink data from a network side device and then sends the downlink data to the processor 610 for processing; and sends uplink data to the network side device. Usually, the radio frequency unit 601 includes but is not limited to an antenna, at least one amplifier, a transceiver, a coupler, a low noise amplifier, a duplexer, and the like.

The memory 609 may be configured to store a software program or instructions and various data. The memory 609 may mainly include a program or instruction storage area and a data storage area. The program or instruction storage area may store an operating system, an application or an instruction required by at least one function (for example, a sound playing function or an image playing function), and the like. In addition, the memory 609 may include a high-speed random access memory, and may further include a non-transient memory. The non-transient memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, such as at least one magnetic disk storage component, a flash memory component, or another non-transitory solid-state storage component.

The processor 610 may include one or more processing units. Optionally, an application processor and a modem processor may be integrated into the processor 610. The application processor mainly processes an operating system, a user interface, an application, an instruction, or the like. The modem processor mainly processes wireless communication, for example, a baseband processor. It may be understood that, alternatively, the modem processor may not be integrated into the processor 610.

The terminal provided in this embodiment of this application can implement the processes implemented in the method embodiment shown in FIG. 2 or FIG. 3 and a same technical effect is achieved. To avoid repetition, details are not described herein again.

Figure 7:
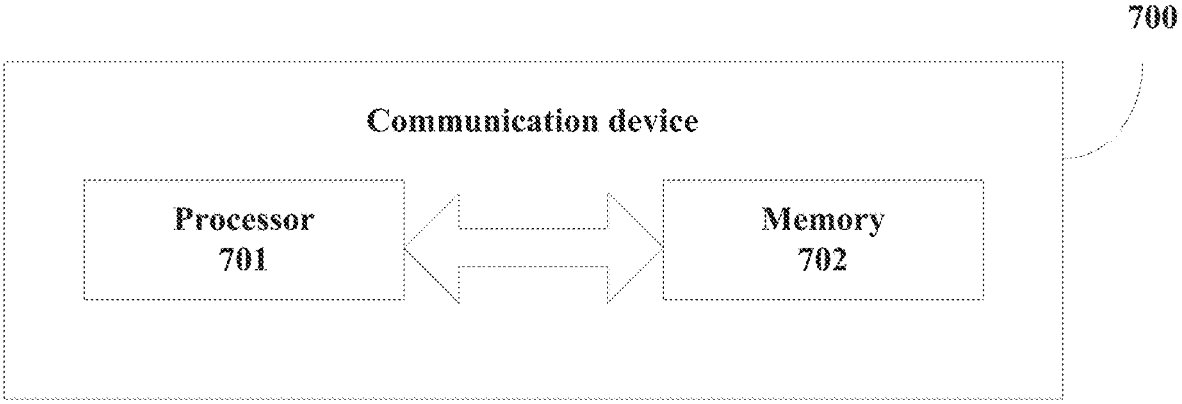
FIG. 7 is a schematic diagram of a communication device according to an embodiment of this application.

Optionally, as shown in FIG. 7, an embodiment of this application further provides a communication device 700, including a processor 701, a memory 702, and a program or instructions stored in the memory 702 and capable of running on the processor 701. For example, when the communication device 700 is a terminal, when the program or the instructions are executed by the processor 701, each process of the method embodiment in FIG. 2 or FIG. 3 is implemented, and a same technical effect can be achieved.

An embodiment of this application further provides a computer program/program product, the computer program/program product is stored in a non-volatile storage medium, and when the computer program/program product is executed by at least one processor, the steps of the processing method according to FIG. 2 or FIG. 3 is performed.

An embodiment of this application further provides a readable storage medium, where the readable storage medium stores a program or instructions, and when the program or the instructions are executed by a processor, the processes of the method embodiments shown in FIG. 2 or FIG. 3 are implemented, and a same technical effect can be achieved. To avoid repetition, details are not described herein again.

The processor is the processor in the terminal or the network side device described in the foregoing embodiment. The readable storage medium includes a computer readable storage medium, such as a read-only memory (ROM), a random access memory (RAM), a magnetic disk, or an optical disc.

An embodiment of this application further provides a chip. The chip includes a processor and a communication interface. The communication interface is coupled to the processor, and when the processor is configured to run a program or instructions, each process of the method embodiment shown in FIG. 2 or FIG. 3 is implemented, and a same technical effect can be achieved. To avoid repetition, details are not described herein again.

It should be understood that the chip mentioned in this embodiment of this application may alternatively be referred to as a system-level chip, a system chip, a chip system, or a system on chip.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to this process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the implementations of this application is not limited to performing functions in an illustrated or discussed order, and may further include performing functions in a basically simultaneous manner or in a reverse order according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, an air-conditioner, a network device, or the like) to perform the method described in the embodiments of this application.

The embodiments of this application are described above with reference to the accompanying drawings, but this application is not limited to the foregoing specific implementations, and the foregoing specific implementations are only illustrative and not restrictive. Under the enlightenment of this application, a person of ordinary skill in the art can make many forms without departing from the purpose of this application and the protection scope of the claims, all of which fall within the protection of this application.

The invention claimed is:

1. A resource reselection method, wherein the method comprises:

sending, by a first terminal, resource conflict indication information to a second terminal based on first information, wherein the first information comprises the following:

the first terminal detecting that a transmission resource of the second terminal is in conflict, and the second terminal being a transmit end of the first terminal;

wherein before sending, by the first terminal, resource conflict indication information to the second terminal based on first information, the method further comprises:

receiving, by the first terminal, second information from the second terminal, wherein the second information indicates whether the second terminal is capable of receiving the resource conflict indication information sent by the first terminal, and/or the second information indicates whether the second terminal is capable of performing resource reselection based on the resource conflict indication information sent by the first terminal;

wherein the resource conflict indication information is used to indicate the second terminal to exclude, when identifying a candidate resource set, a time domain and/or frequency domain transmission resource occupied by a transmission resource on which the first terminal determines to trigger reselection; or the resource conflict indication information is used to indicate the second terminal to exclude, from a candidate resource set when performing resource selection, a time domain and/or frequency domain transmission resource occupied by a transmission resource on which the first terminal determines to trigger reselection.

2. The method according to claim 1, wherein the method further comprises:

sending, by the first terminal, third information to the second terminal, wherein the third information indicates whether the first terminal is capable of detecting that the transmission resource of the second terminal is in conflict, and/or the third information indicates that the first terminal sends the resource conflict indication information when detecting that the transmission resource of the second terminal is in conflict.

3. The method according to claim 1, wherein the method further comprises:

receiving, by the first terminal, fourth information from the second terminal, wherein the fourth information indicates whether the first terminal needs to send the resource conflict indication information when detecting that the first transmission resource is in conflict, and a transmission resource of the fourth information is associated with the first transmission resource.

4. The method according to claim 1, wherein the congestion situation of the resource pool of the first terminal comprises any one of the following:

a congestion degree of the resource pool of the first terminal is higher than a first preset threshold;

a congestion degree of the resource pool of the first terminal is higher than a first preset threshold, and the first terminal detects that the transmission resource of the second terminal is in conflict; or a congestion degree of the resource pool of the first terminal is higher than a first preset threshold, and the first terminal detects that the first transmission resource is in conflict, wherein a transmission priority of the first transmission resource is higher than a second preset threshold; a transmission priority of the first transmission resource is lower than a third preset threshold; or transmission of the first transmission resource is of a preset cast type;

wherein the first preset threshold is specified in a protocol, or configured or pre-configured by a control node.

5. The method according to claim 1, wherein before the step of sending, by the first terminal, the resource conflict indication information based on the first order, the method further comprises:

detecting, by the first terminal, a second transmission resource of at least one transmit end of the first terminal, wherein the second transmission resource is a transmission resource at a first moment.

6. The method according to claim 5, wherein the second transmission resource is a transmission resource reserved by the transmit end of the first terminal, and the reservation comprises at least one of periodic resource reservation or aperiodic resource reservation.

7. The method according to claim 5, wherein when the first terminal detects a plurality of second transmission resources of transmit ends of the first terminal, the method further comprises:

performing, by the first terminal based on a second order, conflict determining on the second transmission resources of the plurality of transmit ends of the first terminal, wherein the second order is determined based on one or more of the following:

a priority of the second transmission resource;

a quantity of transmission resources that conflict with the second transmission resource;

a sequence number of a frequency domain resource of the second transmission resource;

a measurement value of the second transmission resource;

a sending time of first signaling, wherein the first signaling is used by the transmit end of the first terminal to indicate that the second transmission resource is a reserved resource;

a time at which the transmit end of the first terminal selects the second transmission resource;

being autonomously selected by the first terminal;

being specified in a protocol;

being configured by a control node; and being pre-configured.

8. The method according to claim 7, wherein the transmission resource in conflict comprises one or more of the following:

a transmission resource of the transmit end of the first terminal; and a transmission resource of a third terminal, wherein the third terminal is not the transmit end of the first terminal.

9. The method according to claim 7, wherein the performing conflict determining on the second transmission resources of the plurality of transmit ends of the first terminal comprises:

respectively performing conflict determining on first to $N^{th}$ second transmission resources of the transmit ends of the first terminal, wherein N is greater than 1.

10. The method according to claim 9, wherein the respectively performing conflict determining on first to $N^{th}$ second transmission resources of the transmit ends of the first terminal comprises:

detecting whether a second transmission resource of a first transmit end of the first terminal belongs to a non-preferred resource identified by the first terminal; and if the second transmission resource belongs to the non-preferred resource identified by the first terminal, determining that the second transmission resource of the first transmit end is in resource conflict; or detecting whether a second transmission resource of a first transmit end of the first terminal overlaps a transmission resource of any terminal; and if there are overlapping transmission resources, determining that the second transmission resource of the first transmit end is in resource conflict, wherein a transmission type of transmission resources of some or all transmit ends that are of the first terminal and that correspond to the overlapping transmission resources is a preset cast type; or a transmission priority of transmission resources of some or all transmit ends that are of the first terminal and that correspond to the overlapping transmission resources is higher than or equal to a preset priority.

11. The method according to claim 10, wherein the sending the resource conflict indication information comprises:

when it is determined that the second transmission resource of the first transmit end is in resource conflict, sending the resource conflict indication information in a first triggering manner to trigger resource reselection, wherein the first triggering manner comprises: triggering the first transmit end to perform resource reselection; or triggering a target transmit end to perform resource reselection, wherein the target transmit end comprises at least one of the following: the first transmit end; a fourth terminal, wherein the fourth terminal is any terminal that has a resource overlapping the transmission resource of the first transmit end; or a fifth terminal, wherein a transmission resource of the fifth terminal at least partially overlaps the transmission resource of the first transmit end, and the fifth terminal is a transmit end of the first terminal.

12. The method according to claim 11, wherein a measurement value of a transmission resource of the fourth terminal or the transmission resource of the fifth terminal is greater than a fourth preset threshold;

wherein the fourth preset threshold is equal to a first threshold, and the first threshold is a threshold used when the first terminal identifies the non-preferred resource based on strength of a transmission signal on the transmission resource.

13. The method according to claim 11, wherein the triggering a target transmit end to perform resource reselection comprises:

when there are a plurality of target transmit ends, triggering each target transmit end based on a third order to perform resource reselection;

wherein the method further comprises:

after triggering one target transmit end to perform resource reselection, determining, by the first terminal, whether the second transmission resource of the first transmit end is still in resource conflict;

wherein in a process in which the first terminal determines whether the second transmission resource of the first transmit end is still in resource conflict, a transmission resource on which the first terminal determines to perform a resource conflict indication is not comprised in a resource conflict determining process.

14. The method according to claim 11, wherein the first triggering manner comprises: whether to trigger the first transmit end or the target transmit end to perform resource reselection is specified in a protocol.

15. The method according to claim 10, wherein the performing conflict determining on first to $N^{th}$ second transmission resources of the transmit ends of the first terminal further comprises:

when the first terminal performs conflict determining on the second transmission resource of the transmit end of the first terminal, a transmission resource on which the first terminal determines to perform a resource conflict indication is not comprised in a resource conflict determining process.

16. A resource reselection method, wherein the method comprises:

receiving, by a second terminal, resource conflict indication information from a first terminal, wherein the resource conflict indication information is sent by the first terminal based on first information; and performing, by the second terminal, resource reselection based on the resource conflict indication information, wherein the first information comprises the following:

the first terminal detecting that a transmission resource of the second terminal is in conflict;

sending, by the second terminal, second information to the first terminal, wherein the second information indicates whether the second terminal is capable of receiving the resource conflict indication information sent by the first terminal, and/or the second information indicates whether the second terminal is capable of performing resource reselection based on the resource conflict indication information sent by the first terminal;

wherein the performing, by the second terminal, resource reselection based on the resource conflict indication information comprises:

when identifying a candidate resource set, excluding, by the second terminal based on the resource conflict indication information, a time domain and/or frequency domain transmission resource occupied by a transmission resource on which the first terminal determines to trigger reselection;

wherein the resource conflict indication information is used to indicate the second terminal to exclude, when identifying a candidate resource set, a time domain and/or frequency domain transmission resource occupied by a transmission resource on which the first terminal determines to trigger reselection; or the resource conflict indication information is used to indicate the second terminal to exclude, from a candidate resource set when performing resource selection, a time domain and/or frequency domain transmission resource occupied by a transmission resource on which the first terminal determines to trigger reselection.

17. The method according to claim 16, wherein the performing, by the second terminal, resource reselection based on the resource conflict indication information further comprises:

excluding, by the second terminal from a candidate resource set based on the resource conflict indication information, a time domain and/or frequency domain transmission resource occupied by a transmission resource on which the first terminal determines to trigger reselection; or when identifying a candidate resource set, excluding, by the second terminal based on the resource conflict indication information, a time domain and/or frequency domain transmission resource associated with a feedback resource corresponding to a transmission resource on which the first terminal determines to trigger reselection; or excluding, by the second terminal from a candidate resource set based on the resource conflict indication information, a time domain and/or frequency domain transmission resource associated with a feedback resource corresponding to a transmission resource on which the first terminal determines to trigger reselection.

18. A terminal, comprising: a processor, a memory, and a program that is stored in the memory and that is capable of running on the processor, wherein when the program is executed by the processor, the steps of the method according to claim 16 are implemented.

19. A terminal, wherein the terminal is a first terminal, comprising: a processor, a memory, and a program that is stored in the memory and that is capable of running on the processor, wherein the program, when executed by the processor, causes the terminal to perform:

sending resource conflict indication information to a second terminal based on first information, wherein the first information comprises the following:

the first terminal detecting that a transmission resource of the second terminal is in conflict, and the second terminal being a transmit end of the first terminal;

wherein before sending, by the first terminal, resource conflict indication information to the second terminal based on first information, the method further comprises:

receiving, by the first terminal, second information from the second terminal, wherein the second information indicates whether the second terminal is capable of receiving the resource conflict indication information sent by the first terminal, and/or the second information indicates whether the second terminal is capable of performing resource reselection based on the resource conflict indication information sent by the first terminal;

wherein the resource conflict indication information is used to indicate the second terminal to exclude, when identifying a candidate resource set, a time domain and/or frequency domain transmission resource occupied by a transmission resource on which the first terminal determines to trigger reselection; or the resource conflict indication information is used to indicate the second terminal to exclude, from a candidate resource set when performing resource selection, a time domain and/or frequency domain transmission resource occupied by a transmission resource on which the first terminal determines to trigger reselection.

* * * * *